US012718118B2

(12) United States Patent
Arcos Barraquero et al.

(10) Patent No.: US 12,718,118 B2
(45) Date of Patent: Aug. 25, 2026

(54) MODEL-BASED FUNCTIONAL HAZARD ASSESSMENT (FHA)

(71) Applicant: The Boeing Company, Chicago, IL (US)

(72) Inventors: Victor Arcos Barraquero, Torrejón de Ardoz (ES); Sandy Cherian, Munich (DE); Sheila Laurensia Evans, Snohomish, WA (US); Erica Graham, Kenmore, WA (US); James Michael Milstead, Athens, AL (US); Hung Thai, Lynnwood, WA (US); Christopher M. Uyeda, Lynnwood, WA (US); Shakil Ahmed, Bothell, WA (US)

(73) Assignee: The Boeing Company, Arlington, VA (US)

( * ) Notice: Subject to any disclaimer, the term of this patent is extended or adjusted under 35 U.S.C. 154(b) by 1062 days.

(21) Appl. No.: 17/375,815

(22) Filed: Jul. 14, 2021

(65) Prior Publication Data

US 2022/0092447 A1 Mar. 24, 2022

Related U.S. Application Data

(60) Provisional application No. 63/080,474, filed on Sep. 18, 2020.

(51) Int. Cl.
*G06N 5/04* (2023.01)

(52) U.S. Cl.
CPC .................................... *G06N 5/04* (2013.01)

(58) Field of Classification Search
CPC .. G06N 5/04; G06N 5/02; G06N 5/00; G06N 3/04; G06N 3/08
See application file for complete search history.

(56) References Cited

U.S. PATENT DOCUMENTS

2008/0297333 A1* 12/2008 Khuzadi ............ G05B 23/0248 340/438
2015/0095101 A1* 4/2015 Kymal .................... G06F 30/00 705/7.28

OTHER PUBLICATIONS

R. Mader et al., "A Computer-Aided Approach to Preliminary Hazard Analysis for Automotive Embedded Systems," 2011 18th IEEE International Conference and Workshops on Engineering of Computer-Based Systems, Las Vegas, NV, USA, 2011, pp. 169-178 (Year: 2011).*

* cited by examiner

*Primary Examiner* — Kamran Afshar
*Assistant Examiner* — Brian J Hales
(74) *Attorney, Agent, or Firm* — Hanley, Flight & Zimmerman, LLC

(57) ABSTRACT

A model-based functional hazard assessment (FHA) is disclosed. A disclosed example apparatus for generating a model-based FHA associated with a product includes an associator to associate a function of the product to a failure condition to define a first association, and associate a hazard assessment with the failure condition to define a second association, and associate a safety requirement with the hazard assessment to define a third association. The apparatus also includes an organizer to generate the FHA based on the first, second, and third associations. Disclosed examples include automated FHA data validation capabilities.

25 Claims, 7 Drawing Sheets

MODEL-BASED FUNCTIONAL HAZARD ASSESSMENT (FHA)

RELATED APPLICATION

This patent claims the benefit of U.S. Provisional Patent Application No. 63/080,474, which was filed on Sep. 18, 2020. U.S. Patent Application Ser. No. 63/080,474 is hereby incorporated herein by reference in its entirety. Priority to U.S. Patent Application Ser. No. 63/080,474 is hereby claimed.

FIELD OF THE DISCLOSURE

This disclosure relates generally to systems analysis and, more particularly, to model-based functional hazard assessment (FHA).

BACKGROUND

During development or validation of a complex product, such as an aircraft for example, product requirements and functions are used to define and develop an architecture. The architecture include systems, subsystems, assemblies and/or components. Further, failure conditions with an effect on the product caused by one or more failures (e.g., predicted failure condition types, predicted failure types, etc.) can correspond to the functions. Accordingly, functional hazard assessments (FHAs) are utilized to characterize and organize relationships between functions, the associated hazards, and the product architecture to address the safety of the product.

SUMMARY

An example apparatus for generating a model-based functional hazard assessment (FHA) associated with a product includes an associator to associate a function of the product to a failure condition to define a first association, associate a hazard assessment with the failure condition to define a second association, and associate the hazard assessment with a safety requirement to define a third association. The apparatus also includes an organizer to generate the FHA based on the first, second, and third associations.

An example method of generating a model-based functional hazard assessment (FHA) associated with a product includes associating, by executing instructions with at least one processor, a function of the product to a failure condition to define a first association, associating, by executing instructions with the at least one processor, a hazard assessment with the failure condition to define a second association, associating, by executing instructions with the at least one processor, a safety requirement with the hazard assessment to define a third association, and generating, by executing instructions with the at least one processor, the FHA based on the first, second, and third associations.

An example non-transitory machine readable medium includes instructions, which when executed, cause a processor to at least associate a function of a product to a failure condition to define a first association, associate a hazard assessment with the failure condition to define a second association, associate the hazard assessment with a safety requirement to define a third association, and generate a model-based functional hazard assessment (FHA) based on the first, second, and third associations.

An example apparatus for correcting a model-based functional hazard assessment (FHA) associated with a product as the FHA is being generated includes an organizer to generate the FHA based on first, second, and third associations, the first association to associate a function of the product to a failure condition to define a first association, the second association to associate a hazard assessment with the failure condition to define a second association, the third association to associate the hazard assessment with a safety requirement, an error detector to determine an existence of an error associated with data of the FHA, and a corrector to correct the error during generation of the FHA.

An example method of generating a model-based functional hazard assessment (FHA) associated with a product includes generating, by executing instructions with at least one processor, the FHA based on first, second, and third associations, the first association to associate a function of the product to a failure condition, the second association to associate a hazard assessment with the failure condition, the third association to associate a safety requirement with the hazard assessment, performing, by executing instructions with the at least one processor, an assessment of data of the FHA to determine an existence of an error, and correcting, by executing instructions with the at least one processor, the data in response to the determined existence of the error.

A non-transitory machine readable medium includes instructions, which when executed, cause a processor to at least generate a model-based functional hazard assessment (FHA) based on first, second, and third associations, the first association to associate a function of the product to a failure condition, the second association to associate a hazard assessment with the failure condition, the third association to associate at least one safety requirement with the hazard assessment, perform an assessment of data of the FHA to determine an existence of an error, and correct the data in response to the determined existence of the error.

Figure 1:
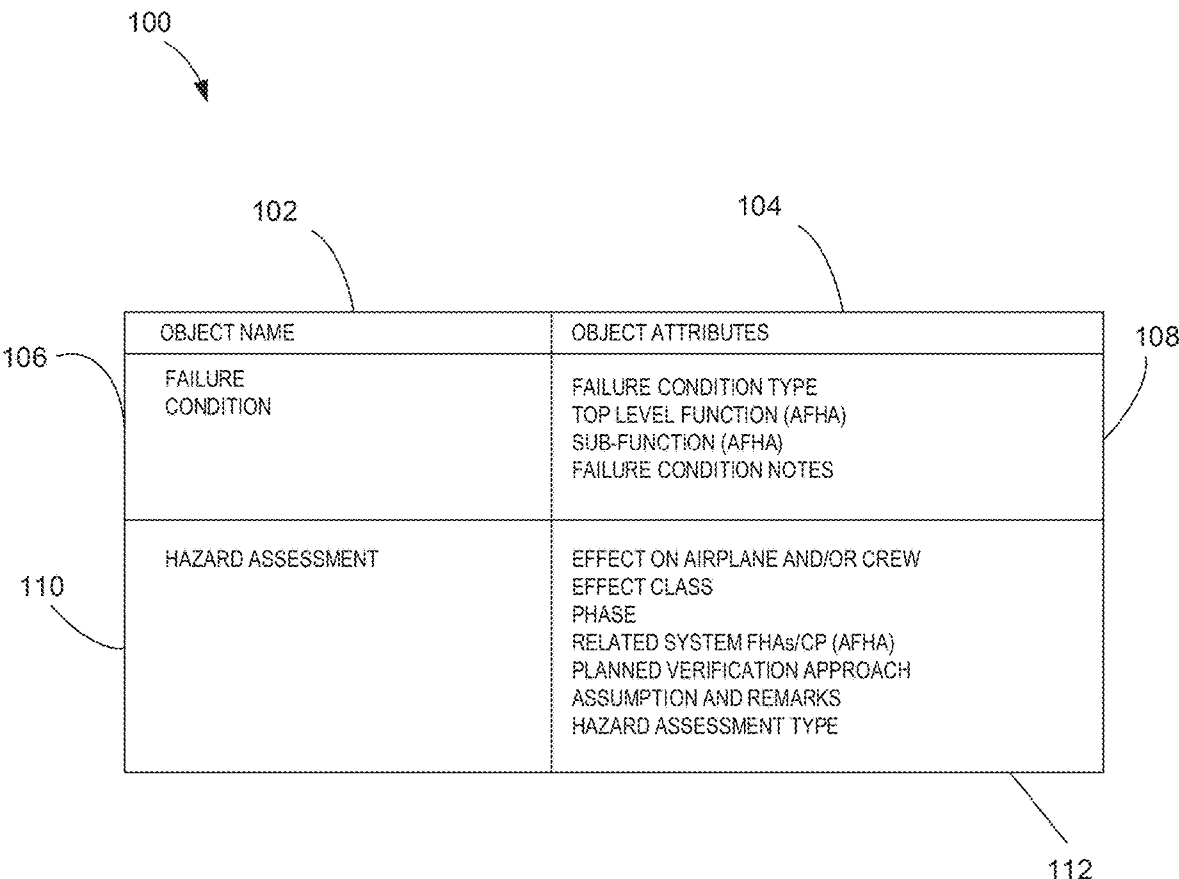
FIG. 1 illustrates an example functional hazard assessment (FHA) data structure.

In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Model-based functional hazard assessment (FHA) is disclosed. During development or validation of an aircraft, for example, product requirements and functions are used to define and develop an overall system architecture (e.g., an overall system design). The architecture can include parts, systems, subsystems, assemblies and/or components. Further, failures of architecture elements can correspond to the functions. In turn, the failures correspond to hazard assessments associated with the functions. In an overall sense, the functions, failure conditions and hazard assessments are brought together to define an FHA, which is used to define safety requirements and to perform an analysis of the aircraft. However, generating FHAs and using it for aircraft or system design analysis in known implementations can be a manual process that is inconsistent due to disjointed, inconsistent and/or incomplete data. For example, the data is typically maintained in unrelated and unlinked spreadsheet files. As a result, in known implementations, FHAs can have significant amounts of data that are inaccurately and/or incompletely associated. Further, auditing the data associated with the FHAs can be a manual and time-consuming process.

Examples disclosed herein enable generation of a model-based FHA (e.g., an overall FHA with multiple sublevel FHAs) corresponding to a product that includes multiple systems and sub-systems. Accordingly, examples disclosed herein associate, correct and/or update data associated with the FHA. As a result, associations between different data categories and/or types are generated to ensure that data is complete and accurate. Further, examples disclosed herein facilitate subsequent auditing of the data. Particularly, examples disclosed herein can facilitate auditing of the data that would otherwise be time-consuming and manual. Accordingly, examples disclosed herein can reduce (e.g., eliminate) time-consuming and inaccurate manual associations and organizing associations with known implementations.

Examples disclosed herein generate an accurate model-based FHA that can be efficiently audited and analyzed. In particular, examples disclosed herein associate a function of a product to a failure condition to define a first association and associate a first hazard assessment with the failure condition to define a second association. The hazard assessment is associated to safety requirements associated with the architecture to define a third association. In turn, an FHA is generated based on the first, second, and third associations. In some examples, the aforementioned first hazard assessment can be associated with a second hazard assessment to define a third association (e.g., a parent-child relationship) by which the FHA is generated. In some examples, an error detector is implemented to detect errors in the FHA as the FHA is being generated, for example. In some such examples, the detected error can be corrected (e.g., during generation or analysis of the FHA).

In some examples, artifacts (e.g., files, documents, etc.) of the FHA are converted to common format(s) for improved data integrity and organization, thereby facilitating subsequent data analysis thereof. In some examples, the FHA is audited for completeness and/or accuracy. The FHA can be audited for gaps in information, missing references, missing hazards, validation, whether data is current/updated, etc. In some examples, a criticality (e.g., a numeric severity value, a severity determination, etc.) corresponding to a function, hazard, failure and/or any of the aforementioned associations is determined. In some examples, stereotypes of data and/or classifications are implemented to facilitate data organization, data categorization and/or organization.

As used herein, the term "function" used in connection with developing a model-based functional hazard assessment (FHA) framework or simply FHA refers to a functional aspect or component associated with a product (e.g., a product being developed and/or validated). Accordingly, as used herein, the term "product" refers to a system, an assembly, software, an assembled product and/or a collection of systems, etc. Accordingly, the term "product" can refer to a relatively large system having multiple subsystems, such as an aircraft, for example. As used herein, the term "stereotype" refers to a coding, category designation and/or naming nomenclature that represents different data types and/or categories within an FHA.

FIG. 1 illustrates an example FHA data structure 100. In the illustrated view of FIG. 1, a first column 102 represents an object name (e.g., an object-type name, an object type, an object classification, etc.) and a second column 104 represents object attributes (e.g., data attributes, data classifications, etc.). In this particular example, a failure condition 106 has corresponding attributes 108, which indicate a failure condition type, a top level function (e.g., an aircraft-level FHA or AFHA), a sub-function (AFHA) and failure condition notes. Further, a hazard assessment 110 has corresponding attributes 112, such as an effect on an aircraft, an effect class, a phase, a related system, planned verification approach, assumption/remarks, and a hazard assessment type, etc. The data structure 100 shown in FIG. 1 is only an example and any appropriate other type of data structure and/or corresponding objects and object attributes can be implemented instead.

Figure 2:
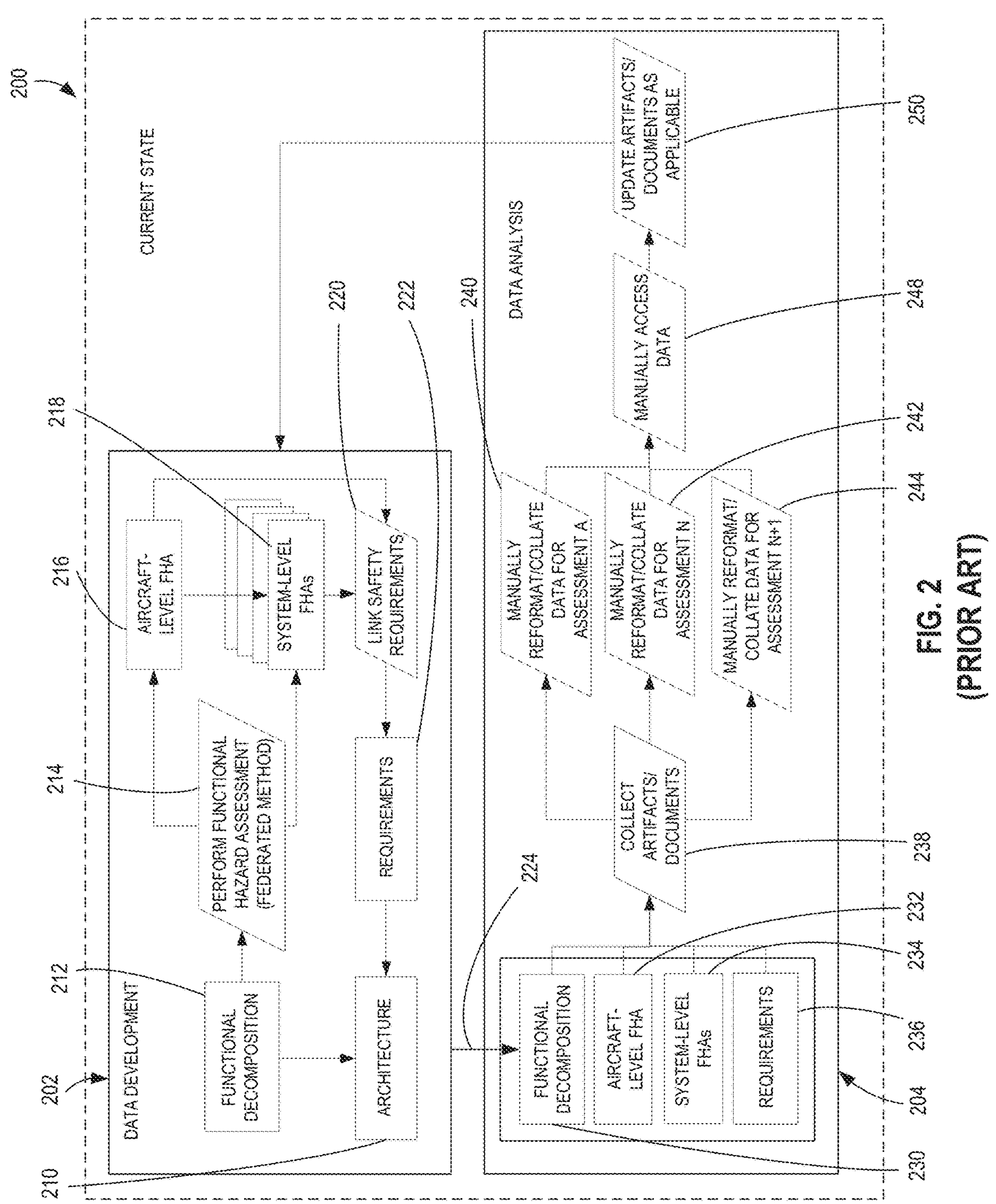
FIG. 2 illustrates a known process flow.

FIG. 2 illustrates a known process flow 200 (e.g., CURRENT STATE). The known process flow 200 includes both a data development portion 202 and a data analysis portion 204. In contrast to examples disclosed herein, the data analysis portion 204 is performed manually and, thus, can be prone to errors and/or incompleteness (e.g., incomplete associations). Further, data of this known implementation is largely unrelated. The process flow 200 of FIG. 2 is shown in the context of developing an aircraft.

In the known data development portion 202, a product architecture 210 is interrelated with a functional decomposition 212 in which functions, sub-functions, and/or aspects are identified, distinguished and/or parsed out. Further, an FHA 214 is performed to yield an aircraft-level FHA (AFHA) 216 and system-level FHAs 218. In turn, the aircraft-level FHA 216 and system-level FHAs 218 are utilized to link and/or yield safety requirements 220, thereby yielding system requirements 222. Further, the architecture 210 is, in turn, defined or redefined based on the system requirements 222.

In this known implementation, the data analysis portion 204 receives data pertaining to the development of the aircraft from the data development portion 202, as generally indicated by an arrow 224. In particular, the data analysis portion 204 includes a functional decomposition 230, an aircraft-level FHA 232, system-level FHAs 234 and requirements 236, all of which are utilized to collect artifacts (e.g., documents, files, data structures, etc.) 238. Further, the data provided to the data analysis portion 204 is used to perform assessment 240, which is denoted as "assessment A," assessment 242, which is denoted as "assessment N," and assessment 244, which is denoted as "assessment N+1," all of which can typically entail manual reformatting/collating re-entry of data, as well as collation at a step 248. The notations of the assessments 240, 242, 244 correspond to reformatting and/or re-collation of different data sets. As a result, processing the data from the data development portion 202 can be subject to errors, gaps and incompleteness. Further, the data can take a relatively significant amount of time and/or labor to be organized and analyzed. In this known implementation, the artifacts 238 are updated to define updated artifacts 250 which, in turn, are provided to the data development portion 202. In contrast to the data analysis portion 204, examples disclosed herein utilize an integrated manner (as opposed to a federated manner) of associating data of an FHA as the FHA is being generated, updated and/or modified. As a result, examples disclosed herein do not necessitate effort-intensive and potentially inaccurate analyses of the FHA, thereby facilitating subsequent analysis and/or auditing.

Figure 3:
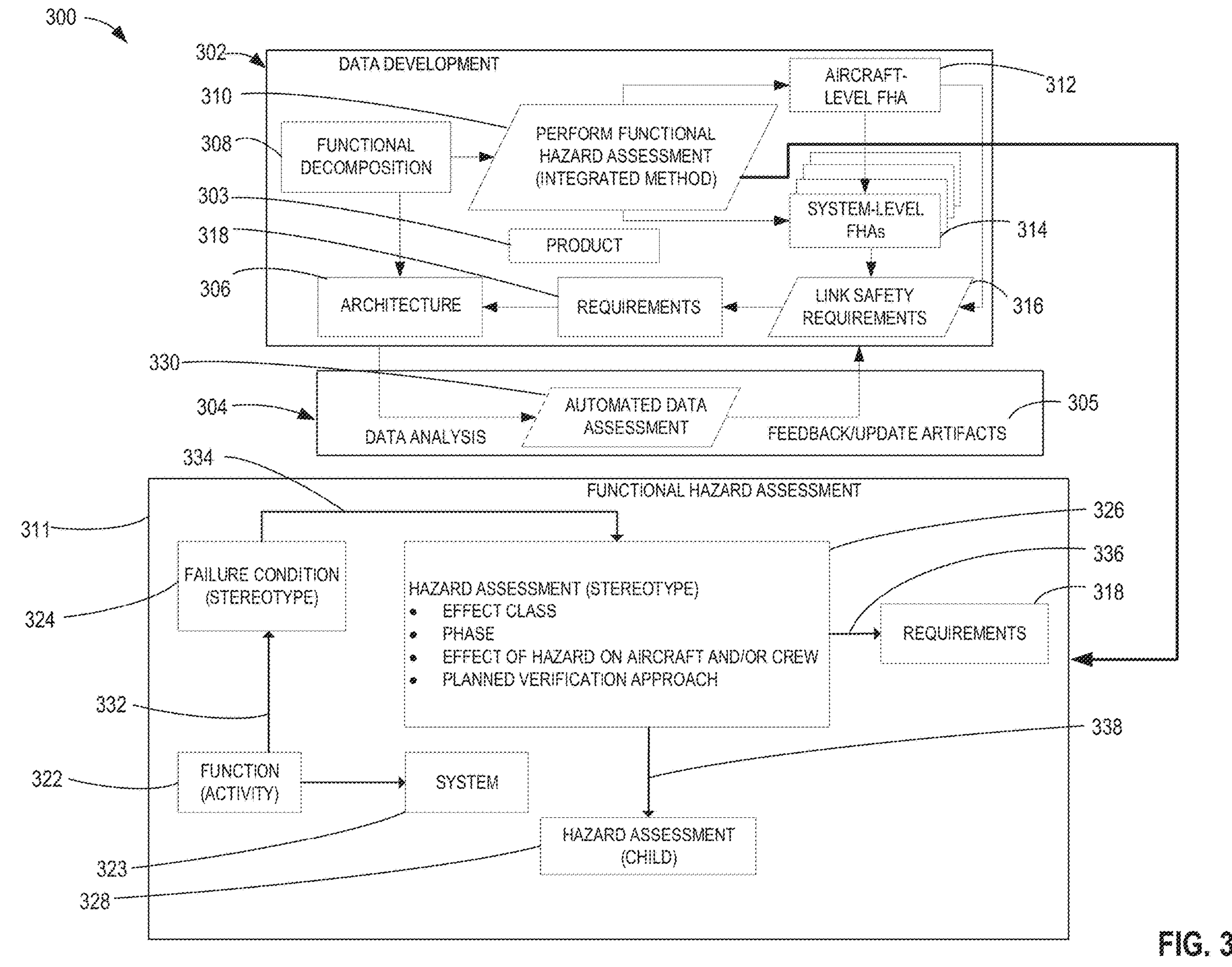
FIG. 3 illustrates an example process flow in accordance with teachings of this disclosure.

FIG. 3 illustrates an example process 300 flow in accordance with teachings of this disclosure. The process flow 300 of the illustrated example corresponds an aircraft including and/or in association with a product 303. The example process flow 300 includes a data development portion 302 and a data analysis portion 304. In this particular example, an architecture 306 represents a design architecture of an aircraft and a functional decomposition 308 corresponds to divided and/or parsed out functions corresponding to the architecture 306. Further, an example integrated (e.g., integrated method) FHA 310 is shown and elaborated with box 311, which can denote an implementation of a meta-model, for example. The example integrated FHA 310 outputs an aircraft-level FHA 312 and system-level FHAs 314. In this example, the aircraft-level FHA 312 and/or the system-level FHAs 314 are provided to a safety requirements 316 which, in turn, are provided to requirements 318. Accordingly, the requirements 318 define the aforementioned architecture 306 of the aircraft.

To associate and/or generate data to facilitate subsequent analyses and/or auditing thereof, a function 322 (or activity) of the aircraft is allocated to a system 323. In the illustrated example, the system 323 corresponds with the architecture 306. Further, the function 322 of the aircraft can be allocated by the system 323 and is associated with a failure condition (e.g., a stereotype, a collection of stereotypes, etc.) 324 to define a first association 332 and, in turn, the failure condition 324 is associated with a hazard assessment 326 to define a second association 334, and the hazard assessment 326 is further associated with at least one of the safety requirements 318 to define a third association 336. The hazard assessment 326 can correspond to, but is not limited to, an effect class, a phase, an effect of a hazard on the aircraft and/or crew, a planned verification approach, etc. In the illustrated example, an FHA is generated based on the first, second, and third associations 332, 334, 336. The first, second, and third associations 332, 334, 336 provide relationships within the data of the FHA (e.g., as metadata of the FHA) for accurate and time-efficient auditing or analysis of the FHA. As a result, the first, second, and third associations 332, 334, 336 facilitate data analysis and/or auditing of the FHA and, thus, can conserve computational resources during subsequent analyses. For example, the first association 332 corresponds to the function 322 having the failure condition 324. The second association 334 can correspond to the failure condition 334 being evaluated by the hazard assessment 326. Further, the third association 336 can correspond to the hazard assessment 326 driving the requirements 318. In other words, the hazard assessment 326 drives the requirements 318.

In some examples, the hazard assessment 326 is associated with another hazard assessment 328 to define a fourth association 338, which can be referred to as a hazard-to-hazard trace. In some such examples, the hazard assessment 328 can be a child data structure of a parent data structure, such as the hazard assessment 326. In other words, the hazard assessments 326, 328 can define a parent-child relationship.

To detect and/or correct errors in data corresponding to the aircraft, the data analysis portion 304 is operated in conjunction with (e.g., simultaneously with) the data development portion 302. In this example, an automated data assessment 330 verifies the data and corrects the data of the FHA (e.g., during or subsequent to generation of the FHA). The data that can be verified by the data assessment 330 includes, but is not limited to, whether the functions of the aircraft are associated with the FHA, whether all FHA data has been entered and/or is complete, whether functions have been analyzed (e.g., failure considerations are included), whether hazard classification between parent and child hazard assessments are aligned, whether flight bases between parent and child hazard assessments are aligned, whether a child FHA is correlated to at least one parent FHA, whether requirements are captured and/or complete, whether parent/child requirements align, whether flight crew aspects have been assessed, whether a safety assessment has been incorporated into the design, etc. In some examples, the automated data assessment 330 provides feedback and/or updates artifacts 305 based on the data. In some examples, a criticality corresponding to an attribute effect class within a hazard assessment is determined and/or defined. In some such examples, a consistency of the criticality is verified when analyzing parent-child hazard assessments.

While the example of FIG. 3 is shown in the context of an aircraft, examples disclosed herein can be applied to any appropriate product, project, system, software implementation, multi-system architecture, etc. Further, the example of FIG. 3 is only an example and any appropriate data architecture and/or hierarchy scheme can be implemented instead.

Figure 4:
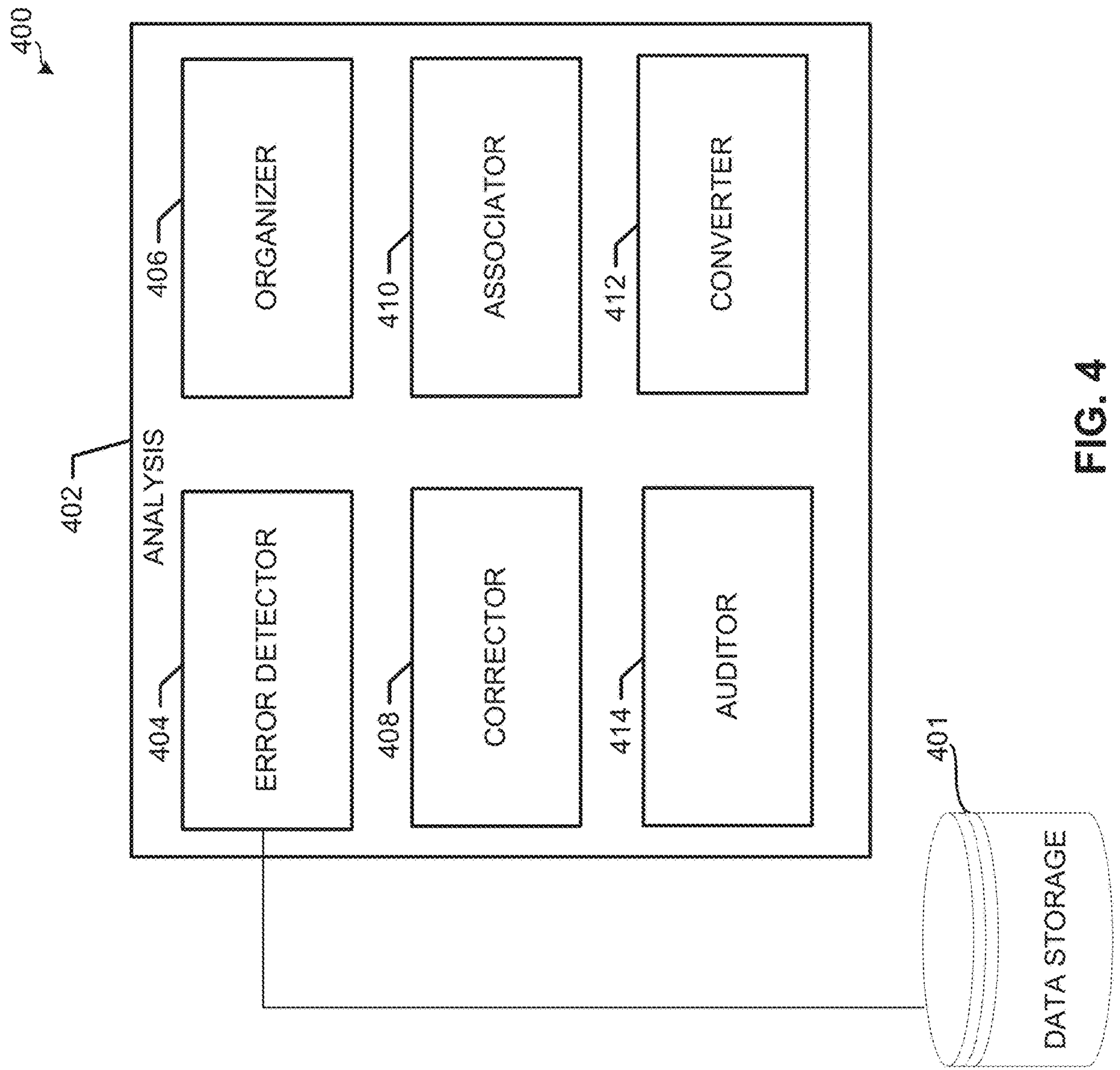
FIG. 4 is a schematic overview of a model-based FHA analyzer system to implement examples disclosed herein.

FIG. 4 is a schematic overview of a model-based FHA analyzer system 400 to implement examples disclosed herein. In particular, the model-based FHA analyzer system 400 is implemented to generate, associate, verify and correct data associated with development, auditing and/or validation of a product. The model-based FHA analyzer system 400 of the illustrated example includes an analysis portion 402 that is communicatively coupled to a data storage 401. In turn, the example analysis portion 402 includes an error detector 404, an organizer 406, a corrector 408 and an associator 410. In some examples, the FHA analyzer system 400 further includes a converter 412 and an auditor 414.

The example associator 410 generates associations and/or links between functions, failure conditions, stereotype artifacts, safety requirements, and/or hazard assessments. The associator 410 of the illustrated example associates a function to a failure condition to define a first association and associates the failure condition to a hazard assessment to define a second association, and associate the hazard assessment to one or more safety requirements to define a third association. In the illustrated example, the associator 410 generates associations between hazard assessments (e.g., as hazard traces). In some examples, the associator 410 generates associations between the hazard assessments and safety requirements. In some examples, the associated hazard assessments include child-to-parent relationship hierarchies.

The error detector 404 of the illustrated example verifies FHAs and/or their associated data. In this example, the error detector 404 performs the automated data assessment associated with the data development portion 302 shown in FIG. 3. For example, the error detector 404 may analyze FHAs generated by the integrated method FHA 310. Additionally or alternatively, the error detector 404 analyzes the FHA for completeness and cohesiveness as the FHA is being generated or modified. In some examples, the error detector 404 analyzes the criticality of a hazard assessment of the FHA. For example, the error detector 404 can identify an incorrect criticality value (e.g., a numeric criticality value) by comparing the criticality value to a parent and/or related hazard assessment to determine whether at least one hazard should be monitored and/or checked.

In this example, the corrector 408 corrects and/or updates artifacts (e.g., files, data, metadata associated with the product) associated with the analysis portion 402 and/or the data development portion 302 shown in FIG. 3. Additionally or alternatively, the corrector 408 corrects data corresponding to the aforementioned first, second, and third associations. In some examples, the corrector 408 corrects, determines and/or generates associations between FHAs and/or artifacts associated with the FHAs.

In some examples, the model-based FHA analyzer system 400 includes an organizer 406 to organize artifacts and/or data associated with the FHAs and stored in the data storage 401. For example, the organizer 406 can organize the artifacts and/or the data in a manner that facilitates later auditing and/or analysis thereof. In other words, the organizer 406 can facilitate storage and/or organization of the data to enable computationally and/or time efficient analysis thereof. In this example, the organizer 406 generates the FHA.

In some examples, the model-based FHA analyzer system 400 includes a converter 412. The converter 412 can be implemented to convert artifact files to common file types to facilitate subsequent analysis and/or audits. For example, the converter 412 converts data associated with the FHA to a common format and/or formats that can be later analyzed. In some examples, the converter 412 is bi-directional. For example, the converter 412 can parse common file types to generate artifacts conformed to the example of FIG. 3.

In some examples, the auditor 414 is implemented to audit the FHA. The FHA can be audited for incorrect and/or incomplete data, for example. The FHA can be audited for completeness, completeness of data associations, correct file formats, a requisite number of associations or functions, etc. In some examples, the auditor 414 provides an analysis of the data associated with the FHA to the corrector 408, thereby enabling accuracy and/or completeness of the data associated with the FHA.

While an example manner of implementing the model-based FHA analyzer system 400 of FIG. 4 is illustrated in FIG. 4, one or more of the elements, processes and/or devices illustrated in FIG. 4 may be combined, divided, re-arranged, omitted, eliminated and/or implemented in any other way. Further, the example error detector 404, the example organizer 406, the example corrector 408, the example associator 410, the example converter 412, the example auditor 414 and/or, more generally, the example model-based FHA analyzer system 400 of FIG. 4 may be implemented by hardware, software, firmware and/or any combination of hardware, software and/or firmware. Thus, for example, any of the example error detector 404, the example organizer 406, the example corrector 408, the example associator 410, the example converter 412, the example auditor 414 and/or, more generally, the example model-based FHA analyzer system 400 could be implemented by one or more analog or digital circuit(s), logic circuits, programmable processor(s), programmable controller(s), graphics processing unit(s) (GPU(s)), digital signal processor(s) (DSP(s)), application specific integrated circuit (s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, error detector 404, the example organizer 406, the example corrector 408, the example associator 410, the example converter 412 and/or the example auditor 414 is/are hereby expressly defined to include a non-transitory computer readable storage device or storage disk such as a memory, a digital versatile disk (DVD), a compact disk (CD), a Blu-ray disk, etc. including the software and/or firmware. Further still, the example model-based FHA analyzer system 400 of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
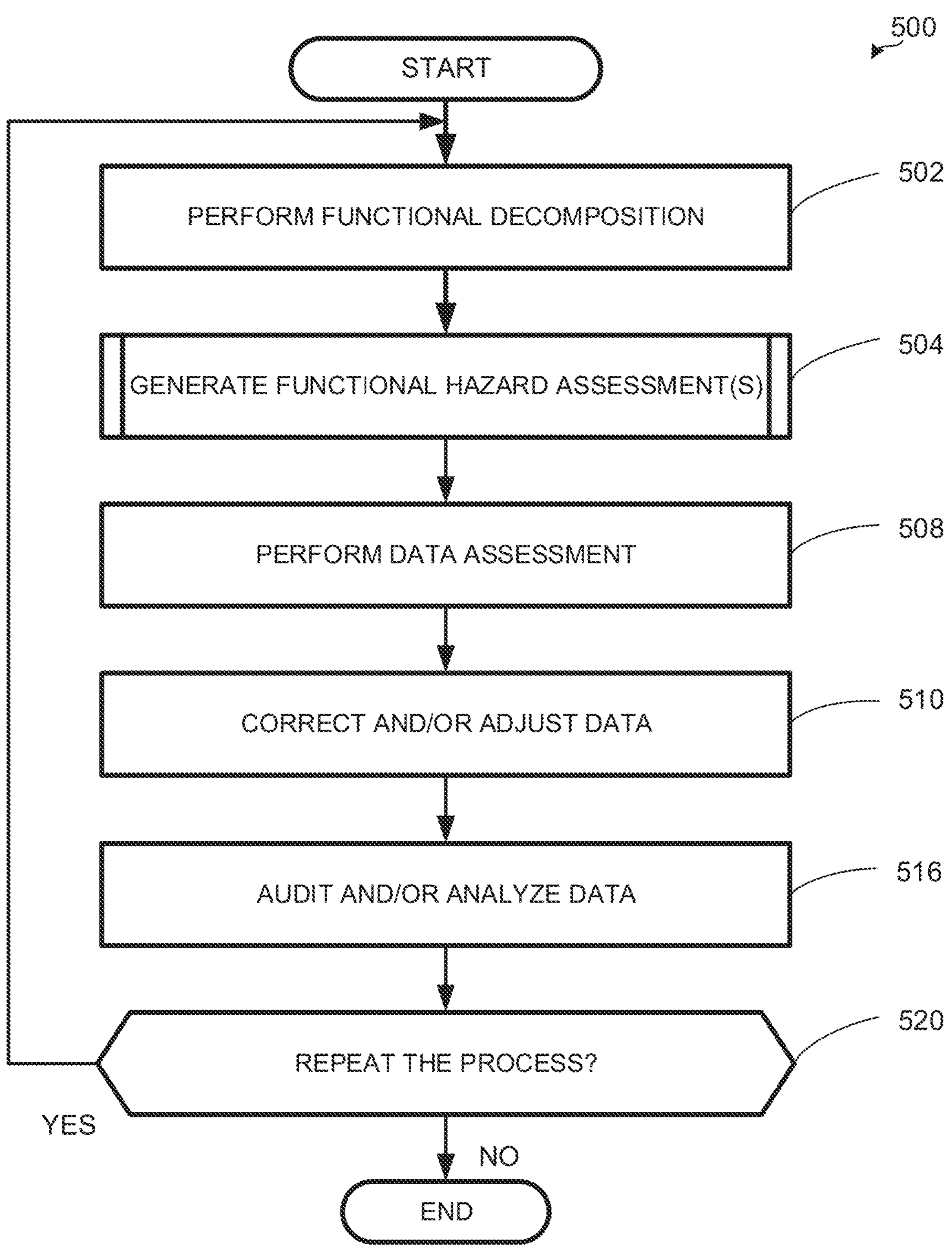
FIG. 5 is a flowchart representative of machine readable instructions which may be executed to implement the example process flow of FIG. 3 and/or the model-based FHA analyzer of FIG. 4.
Figure 6:
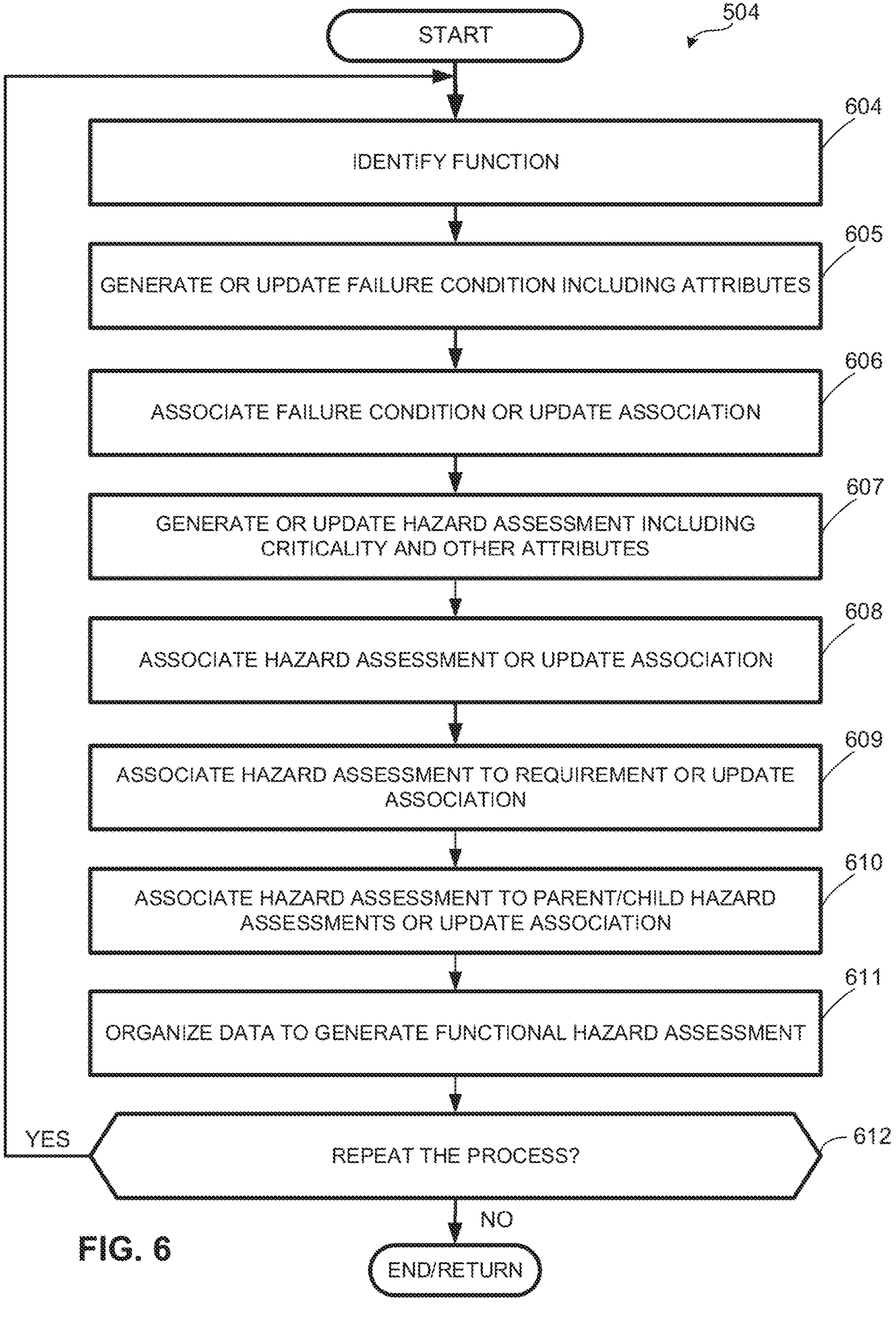
FIG. 6 is a flowchart representative of a subroutine of the machine readable instructions of FIG. 5.

Flowcharts representative of example hardware logic, machine readable instructions, hardware implemented state machines, and/or any combination thereof for implementing the model-based FHA analyzer system 400 of FIG. 4 are shown in FIGS. 5 and 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example model-based FHA analyzer system 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 500 of FIG. 5 begins as a product, which is an aircraft in this example, is being developed and/or validated. In particular, an architecture and system requirements are being defined for the aircraft. In this example, data generated during development will be subsequently audited to ensure that the product requirements, regulatory requirements and/or project management requirements are met. To this end, the example aircraft will have an associated aircraft-level FHA, which includes corresponding FHAs (e.g., lower level FHAs) that are associated with subsystems of the aircraft.

At block 502, the organizer 406 performs a functional decomposition of the product. In particular, functions and/or associated activities of components of the product are identified. The functions may be identified based on an analysis of an architecture of the product and/or product requirements. In some examples, the functions are organized into categories (e.g., type of data categories, etc.) and/or activities associated with the function.

At block 504, as will be discussed in greater detail in connection with FIG. 6 below, at least one FHA is generated by the organizer 406 and/or the associator 410 in conjunction with the error detector 404 and the corrector 408. The FHA can pertain to a product/aircraft-level FHA and/or a system (e.g., sub-system) level FHA.

At block 508, a data assessment of the FHA is performed by the error detector 404. The data assessment can correspond to whether the functions of the product are associated with the FHA, whether all FHA data has been entered and/or the FHA is complete, whether functions have been analyzed (e.g., failure considerations are included), whether hazard classification between parent and child hazard assessments are aligned, whether flight bases between parent and child hazard assessments are aligned, whether a child FHA is correlated to at least one parent FHA, whether requirements are captured and/or complete, whether parent/child requirements align, whether user aspects have been assessed, whether a safety assessment has been incorporated into the design, etc. Additionally or alternatively, the data assessment is performed on the artifacts of the FHA. For example, the data assessment can be performed based on whether sufficient artifacts are associated, whether the artifacts are stored in a desired file format, whether the artifacts are complete, etc.

At block 510, data associated with the FHA is corrected and/or adjusted by the example corrector 408. In this example, the corrector 408 corrects the data based on data assessment performed by the error detector 404. In particular, identified errors from the error detector 404 are corrected by the corrector 408. In some examples, the corrector 408 corrects data of or associated with the aforementioned artifacts.

At block 516, in some examples, the auditor 414 audits the FHA and/or analyzes the FHA data. The FHA can be audited for completeness and/or whether different tasks associated with the FHA are completed. For example, the auditor 414 determines that the aircraft has met different system, regulatory and/or development requirements.

At block 520, it is determined whether to repeat the process. If the process is to be repeated (i.e., a YES) (block 520), control of the process returns to block 502. Otherwise (i.e., a NO), the process ends. The determination of whether to repeat the process may be based on data associated with the FHA having an occurrence of errors below a threshold value. Additionally or alternatively, the determination can be based on whether all of the systems and/or subsystems of the aircraft have been analyzed.

FIG. 6 is a flowchart representative of an example subroutine 504 to generate functional hazard assessment(s) of FIG. 5. In the illustrated example, the subroutine 504 is performed to generate the FHA associated with the product, which is the aforementioned aircraft in this example. The FHA is being generated to facilitate later analyses and/or audits. Further, the FHA is to drive product requirements and/or features.

At block 604, in the illustrated example, a function is identified by the organizer 406. In this example, the function is identified from the functional decomposition performed by the example organizer 406.

At block 605, a condition including attributes is generated or updated by the integrated method FHA 310 and/or the error detector 404. In some examples, the error detector 404 analyzes FHAs generated by the integrated method FHA 310.

At block 606, a failure condition is associated with the function by the associator 410 to define a first association. In some examples, the failure condition is identified as the FHA is being generated (e.g., a contemporaneous determination while the first association is being defined).

At block 607, a hazard assessment including criticality and other attributes is generated or updated by the error detector 404 and/or the organizer 406. In turn, the criticality can be used to drive and/or modify product requirements. In some examples, the criticality is determined and/or calculated based on associations (e.g., parent-child associations) of the FHA.

At block 608, a hazard assessment is associated with the failure condition or an association is updated by the associator 410 to define a second association. The hazard assessment can correspond to a hazard and/or effect associated with the failure condition.

At block 609, the hazard assessment is associated to a requirement (e.g., a safety requirement, a product requirement, etc.) and/or the association is updated by the associator 410 to define a third association. In some examples, the requirements define the aforementioned architecture 306 of the aircraft. The requirement can correspond to the functions, failure conditions, and/or hazard assessments that define an FHA.

At block 610, the hazard assessment is associated to parent and/or child hazard assessments or the association is updated by the associator 410. In some examples, the associator 410 associates the hazard assessment with another hazard assessment associated with the function to define a fourth association.

At block 611, the data is organized by the organizer 406 to generate the FHA. In some examples, the organizer 406 organizes data associated with the aforementioned aircraft-level FHA, which can consist of multiple FHAs. In some examples, the data is sorted based on hazard assessments and/or hierarchical relationships of the aircraft-level FHA. For example, system-level FHAs can be grouped and/or hierarchically organized within or under the aircraft-level FHA. In this example, the organizer 406 generates and/or modifies the FHA based on the first, second and/or third associations. In some examples, the corrector 408 corrects the FHA while the organizer 406 generates the FHA (e.g., during a reiterative process of FHA generation). In other words, the FHA can be verified for completeness and/or accuracy during generation thereof. In some examples, the FHA is generated with the first and second associations (and any additional associations) as associated metadata.

At block 612, it is determined whether to repeat the process. If the process is to be repeated (i.e., a YES) (block 612), control of the process returns to block 604. Otherwise (i.e., a NO), the process ends/returns. This determination can be based on whether additional FHAs are to be generated and/or associated to one another. Additionally or alternatively, the determination is based on whether the FHA has sufficient accuracy and/or a sufficiently low error level.

Figure 7:
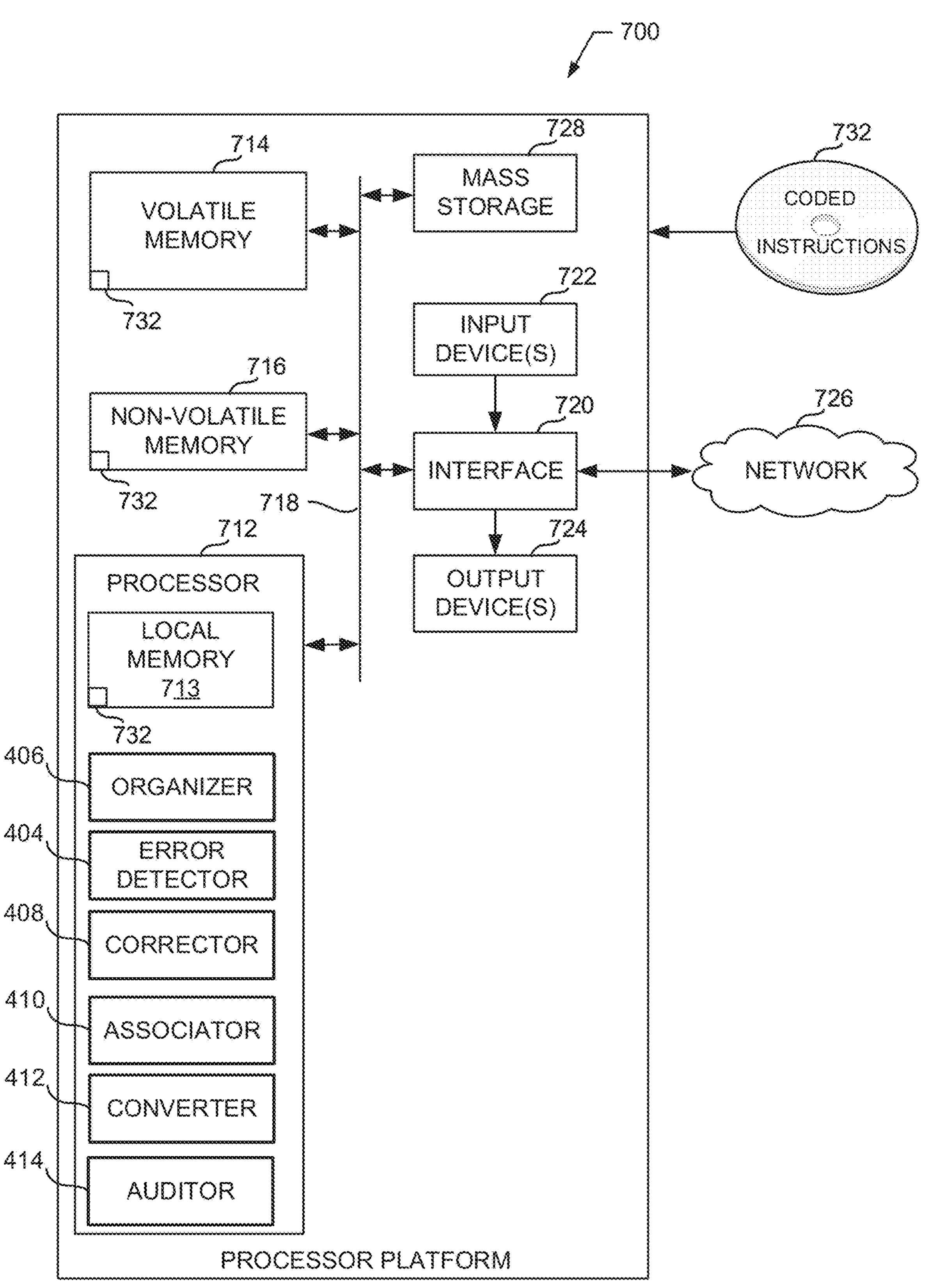
FIG. 7 is a block diagram of an example processing platform structured to execute the instructions of FIGS. 5 and/or 6 to implement the example process flow of FIG. 3 and/or the model-based FHA analyzer of FIG. 4.

FIG. 7 is a block diagram of an example processor platform 700 structured to execute the instructions of FIGS. 5 and 6 to implement the model-based FHA analyzer system 400 of FIG. 4. The processor platform 700 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example error detector 404, the example organizer 406, the example corrector 408, the example associator 410, and the converter 412.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions stored on a non-transitory machine readable medium 732 of FIGS. 5 and 6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that enable generation of data that can be efficiently and quickly analyzed and/or audited. Examples disclosed herein can also enable accurate and/or completeness of FHAs when the FHAs are being created/generated. The disclosed methods, apparatus and articles of manufacture improve the efficiency of using a computing device by generating computationally efficient data for subsequent analysis. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for generating a functional hazard assessment model associated with a product, the apparatus comprising:
- machine-readable instructions; and
- at least one processor circuit to be programmed by the machine-readable instructions to:
  - associate a function of the product to a failure condition to define a first association;
  - associate a hazard assessment with the failure condition to define a second association;
  - associate the hazard assessment with a safety requirement to define a third association;
  - generate the functional hazard assessment model based on the first, second, and third associations;
  - convert file formats of artifacts of the functional hazard assessment model to a target file format;
  - arrange the artifacts with the converted file formats in an arrangement to reduce computational resources for auditing of the functional hazard assessment model based on a completeness metric;
  - cause storage of the artifacts in a computer memory based on the arrangement;
  - determine whether the product meets requirements based on the arranged artifacts, wherein the arranged artifacts enable reduced computational utilization in determining whether the product meets the requirements;
  - update a child model of the functional hazard assessment model based on the determination of whether the product meets the requirements; and
  - cause, based on the updated child model, an adjustment to a feature of the product to enable the product to meet the requirements.

2. The apparatus as defined in claim 1, wherein one or more of the at least one processor circuit is to determine an existence of an error associated with data of the functional hazard assessment model.

3. The apparatus as defined in claim 2, wherein one or more of the at least one processor circuit is to correct the error.

4. The apparatus as defined in claim 1, wherein one or more of the at least one processor circuit is to parse file types to generate the artifacts associated with the functional hazard assessment model.

5. The apparatus as defined in claim 1, wherein the hazard assessment includes a first hazard assessment, and wherein one or more of the at least one processor circuit is to further associate the first hazard assessment with a second hazard assessment to define a fourth association.

6. The apparatus as defined in claim 5, wherein the fourth association includes a parent-child relationship.

7. The apparatus as defined in claim 1, wherein one or more of the at least one processor circuit is to adjust a requirement data of a file corresponding to the product.

8. The apparatus as defined in claim 1, wherein one or more of the at least one processor circuit is to adjust a data structure corresponding to the feature of the product based on the updated child model.

9. The apparatus as defined in claim 1, wherein one or more of the at least one processor circuit is to update product requirement data of the feature based on the updated child model.

10. The apparatus as defined in claim 1, wherein one or more of the at least one processor circuit is determine a relationship between the updated child model and the functional hazard assessment model, and wherein the adjustment of the feature is based on the relationship.

11. The apparatus as defined in claim 1, wherein metadata of the artifacts is converted to convert the file formats.

12. The apparatus as defined in claim 1, wherein at least one of an encryption or a compression of the artifacts is converted to convert the file formats.

13. A method of generating a model-based functional hazard assessment associated with a product, the method comprising:

associating, by executing instructions with at least one processor, a function of the product to a failure condition to define a first association;

associating, by executing instructions with the at least one processor, a hazard assessment with the failure condition to define a second association;

associating, by executing instructions with the at least one processor, a safety requirement with the hazard assessment to define a third association;

generating, by executing instructions with the at least one processor, the functional hazard assessment based on the first, second, and third associations;

converting, by executing instructions with the at least one processor, file formats of artifacts of the functional hazard assessment model to a target file format;

arranging, by executing instructions with the at least one processor, the artifacts with the converted file formats in an arrangement to reduce computational resources for auditing of the functional hazard assessment based on a completeness metric;

causing, by executing instructions with the at least one processor, storage of the artifacts in a computer memory based on the arrangement;

determining, by executing instructions with the at least one processor, whether the product meets requirements based on the arranged artifacts, wherein the arrangement of the artifacts enables reduced computational utilization in the determination of whether the product meets the requirements;

updating, by executing instructions with the at least one processor, a child model of the functional hazard assessment model based on the determination of whether the product meets the requirements; and causing, based on the updated child model, an adjustment to a feature of the product to enable the product to meet the requirements.

14. The method as defined in claim 13, wherein the hazard assessment includes a first hazard assessment, and further including associating, by executing instructions with the at least one processor, the first hazard assessment with a second hazard assessment to define a fourth association.

15. The method as defined in claim 14, wherein the fourth association includes a parent-child relationship.

16. The method as defined in claim 13, further including:

performing, by executing instructions with the at least one processor, an assessment of data of the functional hazard assessment to determine an existence of an error; and correcting, by executing instructions with the at least one processor, the data in response to the determined existence of the error.

17. The method as defined in claim 11, wherein the error includes incomplete associations of data associated with the functional hazard assessment.

18. The method as defined in claim 13, further including parsing, by executing instructions with the at least one processor, file types to generate the artifacts associated with the functional hazard assessment.

19. An apparatus for correcting a model-based functional hazard assessment associated with a product as the functional hazard assessment is being generated, the apparatus comprising:

machine-readable instructions; and at least one processor circuit to be programmed by the machine-readable instructions to:

generate the functional hazard assessment based on first, second, and third associations, the first association to associate a function of the product to a failure condition, the second association to associate a hazard assessment with the failure condition, the third association to associate a safety requirement with the hazard assessment;

determine an existence of an error associated with data of the functional hazard assessment;

correct the error during generation of the functional hazard assessment;

convert file formats of artifacts of the functional hazard assessment model to a target file format;

arrange the artifacts with the converted file formats in an arrangement to reduce computational resources for auditing of the functional hazard assessment based on a completeness metric;

cause storage of the artifacts in a computer memory based on the arrangement;

determine whether the product meets requirements based on the arranged artifacts, wherein the arranged artifacts enable reduced computational utilization in the determination of whether the product meets the requirements;

update a child model of the functional hazard assessment model based on the determination of whether the product meets the requirements; and cause, based on the updated child model, an adjustment to a feature of the product to enable the product to meet the requirements.

20. The apparatus as defined in claim 19, wherein one or more of the at least one processor circuit is to parse file types to generate the artifacts associated with the functional hazard assessment.

21. The apparatus as defined in claim 19, wherein the hazard assessment includes a first hazard assessment, and wherein one or more of the at least one processor circuit is to further associate the first hazard assessment with a second hazard assessment to define a fourth association.

22. The apparatus as defined in claim 21, wherein the fourth association includes a parent-child relationship.

23. A method of generating a model-based functional hazard assessment associated with a product, the method comprising:

generating, by executing instructions with at least one processor, the functional hazard assessment based on first, second, and third associations, the first association to associate a function of the product to a failure condition, the second association to associate a hazard assessment with the failure condition, the third association to associate a safety requirement with the hazard assessment;

performing, by executing instructions with the at least one processor, an assessment of data of the functional hazard assessment to determine an existence of an error;

correcting, by executing instructions with the at least one processor, the data in response to the determined existence of the error;

converting file formats of artifacts of the functional hazard assessment model to a target file format;

arranging, by executing instructions with the at least one processor, the artifacts with the converted file formats in an arrangement to reduce computational resources for auditing of the functional hazard assessment based on a completeness metric;

causing, by executing instructions with the at least one processor, storage of the artifacts in a computer memory based on the arrangement;

determining, by executing instructions with the at least one processor, whether the product meets requirements based on the arranged artifacts, wherein the arranged artifacts enable reduced computational utilization in the determination of whether the product meets the requirements;

updating, by executing instructions with the at least one processor, a child model of the functional hazard assessment model based on the determination of whether the product meets the requirements; and causing, by executing instructions with the at least one processor, an adjustment to a feature of the product to enable the product to meet the requirements based on the updated child model.

24. The method as defined in claim 23, wherein at least one of:

the hazard assessment includes a first hazard assessment, and further including associating, by executing instructions with the at least one processor, the first hazard assessment with a second hazard assessment to define a fourth association; or the error includes incomplete associations of data associated with the functional hazard assessment.

25. The method as defined in claim 24, wherein the fourth association includes a parent-child relationship.

* * * * *